United States Patent [19]
Plummer

[11] 3,849,864
[45] Nov. 26, 1974

[54] METHOD OF MAKING BELLOWS

[76] Inventor: Walter A. Plummer, 3546 Crownridge Dr., Sherman Oaks, Calif. 91101

[22] Filed: May 22, 1973

[21] Appl. No.: 362,660

Related U.S. Application Data

[63] Continuation of Ser. No. 147,417, May 27, 1971, abandoned.

[52] U.S. Cl................ 29/454, 29/447, 156/86, 174/DIG. 8, 264/230, 264/342 R
[51] Int. Cl.............................................. B23p 19/04
[58] Field of Search .......... 29/454, 447, 169.5, 453; 156/84, 85, 86, 66, 91, 92; 264/342 R, 230, DIG. 71; 174/DIG. 8, DIG. 11; 138/121, 122, 138/151, 156

[56] References Cited
UNITED STATES PATENTS

| | | | |
|---|---|---|---|
| 3,223,565 | 12/1965 | Fritz et al. | 156/86 |
| 3,245,852 | 4/1966 | Martin et al. | 156/86 |
| 3,467,761 | 9/1969 | Plummer | 174/36 |
| 3,532,571 | 10/1970 | Ausnit | 156/91 |
| 3,568,308 | 3/1971 | Plaskon | 174/112 X |

FOREIGN PATENTS OR APPLICATIONS

| | | | |
|---|---|---|---|
| 862,795 | 3/1961 | Great Britain | 156/86 |

Primary Examiner—C. W. Lanham
Assistant Examiner—Victor A. DiPalma
Attorney, Agent, or Firm—Sellers and Brace

[57] ABSTRACT

An axially contractable and expandable resilient bellows and a simple method of making the same from flexible heat reactive thermoplastic sheet material. The bellows may include a separable seam formed of interlocking tongue and groove plastic tapes permitting the installation and removal of the bellows without need for access to the opposite ends of the structure embraced. The processing of the bellows includes heating the material while supported on a coil or the like to shrink the same and form a deep spiralling convolution therealong. Any of a wide variety of shapes can be formed by selecting an appropriate form.

8 Claims, 4 Drawing Figures

INVENTOR
WALTER A. PLUMMER

METHOD OF MAKING BELLOWS

This application is a continuation of my copending application for U.S. Pat. Ser. No. 147,417, filed May 27, 1971, now abandoned, entitled Bellows and Method of Making Same.

This invention relates to flexible tubular enclosures, and more particularly to a seamed bellows and a method of making the same from heat reactive thermoplastic material.

There are many environments in which there is need for a flexible bellows-like enclosure, protective boot or fluid-conveying means. Various proposals have been made heretofore to meet these and the like needs but these are subject to numerous shortcomings and disadvantages sought to be eliminated by the present invention. For example, prior constructional methods resort to complex hand-manipulative manufacturing operations or to molding techniques requiring costly molds, much handling and costly processing equipment.

By the present invention there is provided an extremely simple, inexpensive technique readily lending itself to either small or large scale production and providing a resultant product of excellent appearance, suppleness and flexibility, requiring a minimum of manufacturing equipment, and capable of being produced with unskilled labor.

The product is made from a suitable gauge of nonwoven impervious heat reactive thermoplastic sheet material. Desirably, the opposite lateral edges of a selected size and shape of sheet material is equipped with thermoplastic internested seam strips which are assembled prior to the bellows shaping operation. The latter is carried out by assembling the tubular member over any suitable form, such as a series of spaced-apart rings or a flexible helical coil of a desired pitch. The operator then subjects the assembly to mild heating adequate to soften the homogenous sheet of thermoplastic material and allowing the internal stresses to shrink the material to provide a corrugation between adjacent convolutions of the supporting form. As the bellows cools it takes a firm set in the new configuration which it permanently retains thereafter. The presence of the seam permits the finished bellows to be installed or removed from the side of an object to be enclosed or protected.

Accordingly it is a primary object of the invention to provide an improved light-weight, flexible bellows capable of being installed about and removed from an object the opposite ends of which are inaccessible or larger than the bellows.

Another object of the invention is an improved bellows-like article of manufacture and an improved method of making the same from non-metallic supple highly flexible impervious material.

Another object of the invention is the provision of an improved technique for making a flexible bellows-like protective boot of generally tubular configuration.

These and other more specific objects will appear upon reading the following specification and claims and upon considering in connection therewith the attached drawing to which they relate.

Referring now to the drawing in which a preferred embodiment of the invention is illustrated:

Figure 1:
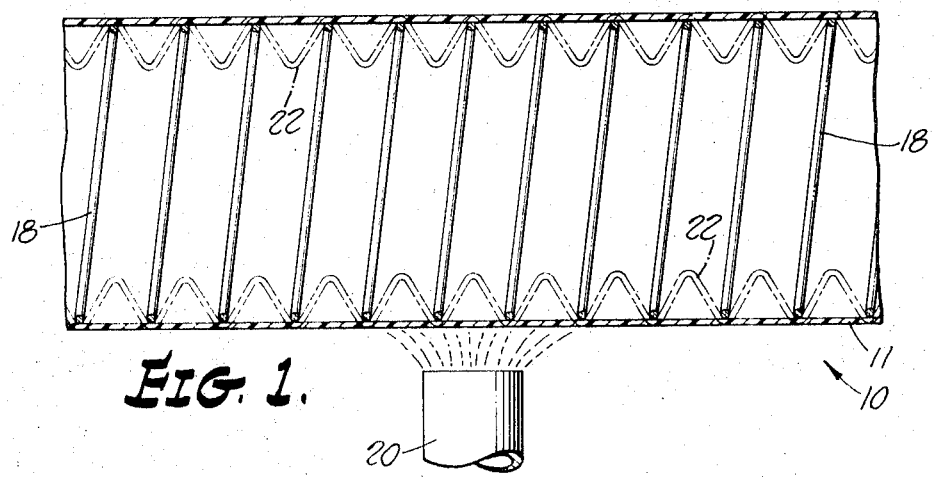
FIG. 1 is a longitudinal sectional view of the invention bellows structure being shrunk to its final configuration.
Figure 2:
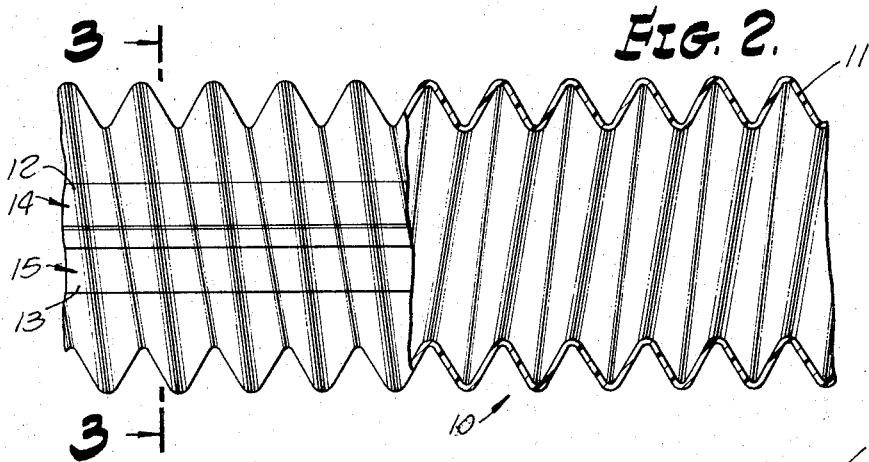
FIG. 2 is a longitudinal view partly in cross section to a typical configuration of the bellows.
Figure 3:
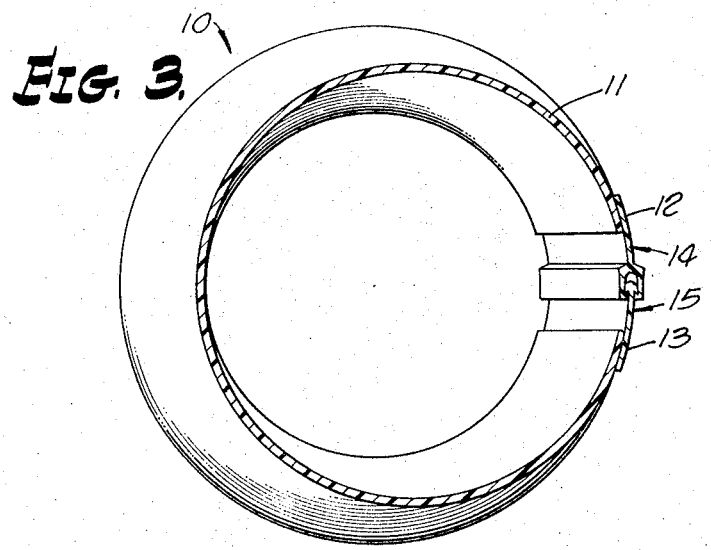
FIG. 3 is a cross sectional view on an enlarged scale taken along line 3—3 on FIG. 2.

Referring more particularly to FIGS. 1-3, there is shown one typical embodiment of the invention bellows, designated generally 10, formed from a single elongated strip of thin flexible impervious heat reactive thermoplastic material 11. Homogenous sheet polyvinyl chloride is one of several well known thermoplastic materials having suitable properties. This material is treated in one of several well known manners to give it a very high shrinkage coefficient. For example, the sheet material as manufactured may be subjected to very substantial stretching in both directions while heated, and then held in stretched condition while cooling and taking a set. Thereafter, if the material is heated to the softening point of the plastic, the internal stresses locked into the material when initially heated and stretched are released allowing the memory of the material to restore it to approximately its original manufactured condition. A shrinkage coefficient of 20 percent or more is easily imparted to the material.

Before being processed to form a bellows, sheet 11 is heat-fused or otherwise bonded to the mounting edges 12,13 of a pair of interlocking seam forming tapes 14,15. These tapes are made of extruded thermoplastic material and may have interlocking tongues and grooves of many well known configurations. A particularly satisfactory seam structure is that illustrated in FIG. 3 wherein the free edge of tape 14 is of U-shape in cross section and formed with a pair of inturned tongues along the ends of its two legs. Mating tape 15 has an enlarged T-head portion receivable between the legs of the U-shaped member and having tongues complementally in shape with the tongues of the U-shaped member. It will be understood that various other forms of separable thermoplastic seam structures may be used in lieu of that illustrated in FIG. 3.

After the seam tapes 14,15 have been mated with one another the tubular structure is telescoped over a suitable form, such as the wire coil 18 shown in FIG. 1. Desirably a coil is selected which fits snugly against the interior sidewall of the tube and has a pitch corresponding to the pitch of the corrugations desired in the finished bellows product. The assembly having been made, the plastic tube is subjected to low temperature heating as by bathing the exterior with heated air from a hand-held blower the outlet of which is indicated at 20 in FIG. 1. This air is passed over the entire length of the bellows gradually bringing it to a temperature at which the plastic material begins to soften. At this point the plastic material begins to shrink and assumes the corrugated condition indicated by the dot-and-dash lines 22. After all parts of the tube have been shrunk to the desired degree the hot air blast is removed. After cooling the bellows will retain the permanent set condition and configuration and coil 18 may be removed.

The finished product has the configuration shown in FIGS. 2 and 3 and is readily expandable and contractable lengthwise and is otherwise highly flexible permitting it to be assembled around corners, bends and other twisted configurations while retaining its basically tubular configuration.

Of particular importance, the presence of the seam permits the interlocking seam-forming tapes 14,15 to be separated progressively from end to end of the seam. As will be recognized, this facilitates reassembling the bellows about any object from the side thereof after which the seam may be closed by inserting the T-shaped head portion between the legs of the U-shaped tape member. When the seam has been reassembled the bellows structure is substantially dust and fluid-tight.

Figure 4:
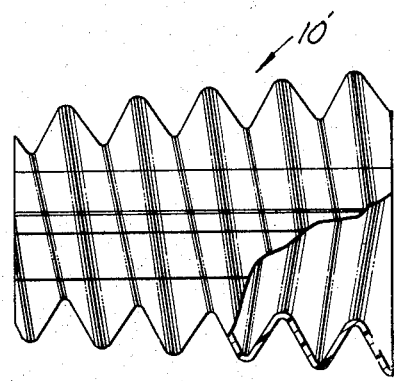
FIG. 4 is a side view of another typical configuration of the bellows.

Referring now to FIG. 4, there is shown a second typical embodiment of the invention comprising a frusto-conical bellows-like boot 10' which differs from the first described embodiment only in its conical configuration. The boot is provided with a seam of the same type shown in FIG. 3 and it is formed by telescoping the frusto-conical tubular assembly over a form, such as a wire helix, and then subjected to heating to shrink it into its finished bellows configuration as illustrated.

From the foregoing it will be apparent that the principles of the present invention can be applied in the manner disclosed to provide flexible, non-metallic bellows of a wide variety of configurations and preferably equipped with a separable plastic seam extending from end-to-end thereof. The finished product comprises a unitary assembly free of either internal or external supports or restraints of any nature.

While the particular bellows and method of making same herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. That method of making a flexible axially extendable and contractable bellows having a readily opened and reclosed seam extending lengthwise thereof which comprises securing a pair of seam-forming thermoplastic tapes having interlocking but separable tongues and grooves along the opposite lateral edges of an elongated impervious non-woven sheet of homogenous heat reactive thermoplastic material having a high shrinkage coefficient, closing said seam and telescoping the resulting tubular assembly about a form having a generally annular axially spaced apart ridge forming means with the exterior thereof fully exposed and free of any encircling contractile means, heating said tubular assembly sufficiently to release the internal stresses therein causing said sheet material to heat shrink and contract against said form to form corrugation convolutions thereabout, and removing said form.

2. That method defined in claim 1 characterized in the step of using a flexible wire-like coil as the supporting form and having a pitch corresponding to the pitch of the spiral corrugation desired in the finished tubular product.

3. That method defined in claim 1 characterized in the steps of securing said seam-forming thermoplastic tapes along the opposite converging edges of a sheet of said heat reactive thermoplastic material shaped to form a conical bellows, closing said seam, and assembling the resulting conical tube coaxially of a tapering wire helix before heating and shrinking said conical tube to form a conical bellows.

4. That method defined in claim 1 characterized in the step of removing the completed bellows from said ridge forming means by opening said seam from end to end of said bellows.

5. That method defined in claim 1 characterized in that said wire-like coil has a normal relaxed size and shape fitting generally snugly against the interior surface of said tubular member after said seam is closed and before said member is heated to release the internal stresses therein and responsible for shrinking said member when heated.

6. That method defined in claim 1 characterized in the step of using a generally conically shaped ridge forming means telescopically assembled into said tubular assembly prior to heating the latter to shrink it against said ridge forming means.

7. That method defined in claim 1 characterized in the step of providing said bellows with separable reclosable interlocking seam means extending lengthwise thereof.

8. That method defined in claim 7 characterized in the step of using seam means comprising a pair of thermoplastic tapes.

* * * * *